June 18, 1957   J. HALAHAN ET AL   2,795,994
MICROFILM READER

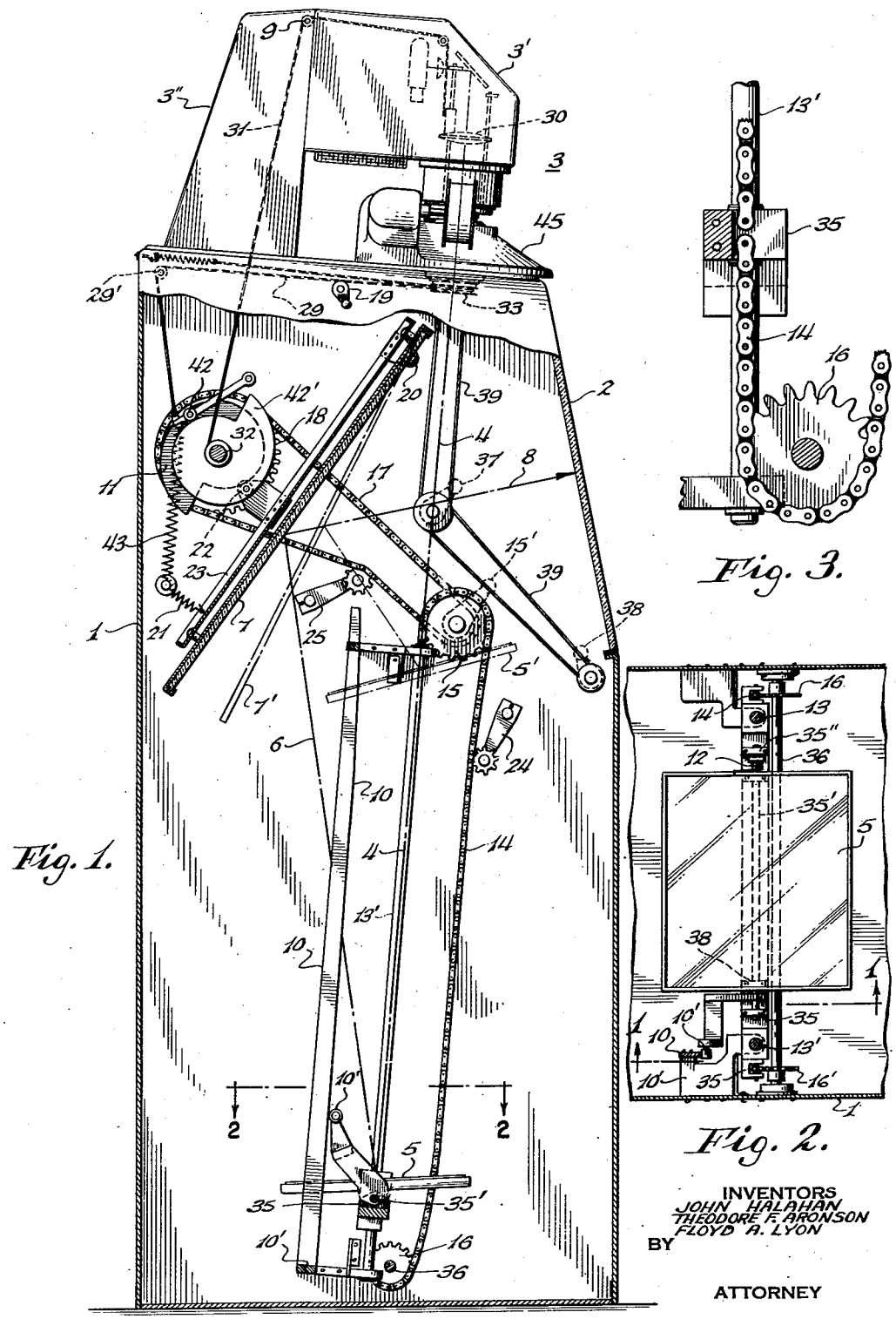

Filed Nov. 18, 1953   3 Sheets-Sheet 2

INVENTORS
JOHN HALAHAN
THEODORE F. ARONSON
FLOYD A. LYON
BY

ATTORNEY

INVENTORS
JOHN HALAHAN
THEODORE F. ARONSON
FLOYD A. LYON
BY

ATTORNEY

2,795,994
Patented June 18, 1957

2,795,994
MICROFILM READER

John Halahan, Brookville, Theodore F. Aronson, Valley Stream, and Floyd A. Lyon, Brookville, N. Y., assignors to Viewlex, Inc., Long Island City, N. Y., a corporation of New York Application November 18, 1953, Serial No. 392,959

13 Claims. (Cl. 88—24)

This invention relates to microfilm readers and more particularly to such means having a stationary viewing screen, improved magnification, and brightness stabilization means.

Microfilm readers of the prior art generally have non-stationary viewing screens, and are limited to a minimum magnification of approximately 23 diameters. They generally control the brightness on the viewing screen with a mechanical diaphragm thereby throwing away a portion of the available light. Non-stationary screens are subject to blurring due to undesired movements of the screen. They also make it necessary for the viewer to adjust the screen and thereby offer an additional possibility of error. Devices of the prior art generally have a projector on top of a cabinet which projects onto a single mirror adjustably mounted substantially behind the viewing screen which is on the front of the cabinet. The magnification of devices of this kind are limited since the single mirror must be mounted substantially behind the viewing screen thereby limiting the image distance and therefore, the magnification which is proportional thereto.

One of the primary problems in devices of this type is to obtain maximum magnification. The magnification is proportional to the distance between the objective lens and the screen. Therefore, the possible maximum magnification is determined by space limitations. The present invention greatly increases the distance between the projector and the viewing screen by using a double mirror system. One of the mirrors may be lowered almost to the floor and the second mirror is mounted substantially behind the viewing screen. This greatly increases the distance between the projector and viewing screen and provides maximum magnification for a device of this general character. An embodiment of the present invention provides magnification up to at least 30 diameters.

Another problem is to maintain a constant brightness of the viewing screen while varying the magnification and image distance over a ratio of approximately 3:1 since the brightness varies as the square of the magnification or 9:1. This variation is too much for proper viewing and means must be taken to modify it.

The present invention solves this problem with a sliding lens system which varies the angle of the projected light cone without wasting any light. The sliding lens system is automatically varied when the magnification is changed so that the brightness is automatically stabilized. Prior art devices generally use a mechanical diaphragm for cutting off a portion of the light thereby wasting some of the available light. At the large magnification of the present invention, if all the light is not utilized, the size of the projector lamp would be prohibitive.

The present invention generally comprises a cabinet about shoulder high having a projecting head on top and a stationary viewing screen in its upper front portion. The image is projected from the projector to a first mirror which is adapted to be lowered almost to the floor and which is slightly adjustable about the horizontal plane by means of a cam which adjusts the angle according to the height of the mirror. A second mirror is adjustably mounted substantially behind the viewing screen and is also cam regulated and connected to the first one. The magnification is changed by raising or lowering the first mirror. The mirrors are automatically tilted by their cams to keep the image properly centered on the stationary viewing screen.

Due to the fact that the magnification varies over a ratio of 3:1, it is necessary to incorporate means to stabilize the brightness of the light on the viewing screen. This is done in the present invention with an adjustable lens system which is interposed between the projector light and the film. This lens slides along the light path in response to the position of the magnification control as will be more fully described. Automatic focusing of the image on the screen is also provided and is connected to the objective lens and responsive to the magnification control.

Accordingly, a principal object of the invention is to provide new and improved microfilm reader means.

Another object of the present invention is to provide new and improved microfilm reader means having maximum magnification.

Another object of the present invention is to provide new and improved microfilm reader means having maximum magnification by using a pair of mirrors one of said mirrors being adapted to be lowered near the floor, and a stationary viewing screen.

Another object of the present invention is to provide new and improved microfilm reader means having maximum magnification and automatic means to stabilize brightness on the screen as the magnification is changed.

Another object of the present invention is to provide new and improved microfilm reader means having maximum magnification and automatic means to stabilize brightness on the screen and means to automatically focus the image on the screen as the magnification is changed.

Another object of the present invention is to provide new and improved microfilm reader means having optimum magnification, automatic means to stabilize brightness on the screen and means to automatically focus the objective lens as the magnification is changed.

Another object of the present invention is to provide new and improved microfilm reader means utilizing a lens system to vary the brightness of the screen.

Another object of the present invention is to provide film reading apparatus utilizing film pressure plates of the type having both the lower and upper plates movable.

Another object of the present invention is to provide new and improved film reading apparatus having a stationary screen, a first mirror adapted to be lowered almost to the floor, the second mirror located substantially behind the viewing screen and cam means connected to said mirrors to maintain the image on a stationary screen as the magnification is changed by raising or lowering the first mirror.

Another object of the present invention is to provide new and improved film reading apparatus having a stationary screen, a first mirror adapted to be lowered almost to the floor, the second mirror located substantially behind the viewing screen and cam means connected to said mirrors to maintain the image on the screen as the magnification is changed by raising or lowering the first mirror, automatic brightness control comprising a movable lens system and automatic focus control.

These and other objects of the invention will be apparent from the following specification and drawings of which:

Figure 1 is a sectional side view of an embodiment of the invention taken along the lines 1—1 of Figure 2.

Figure 2 is a sectional view taken along the lines 2—2 of Figure 1.

Figure 3 is a detail view of a portion of Figure 1.

Figure 4:
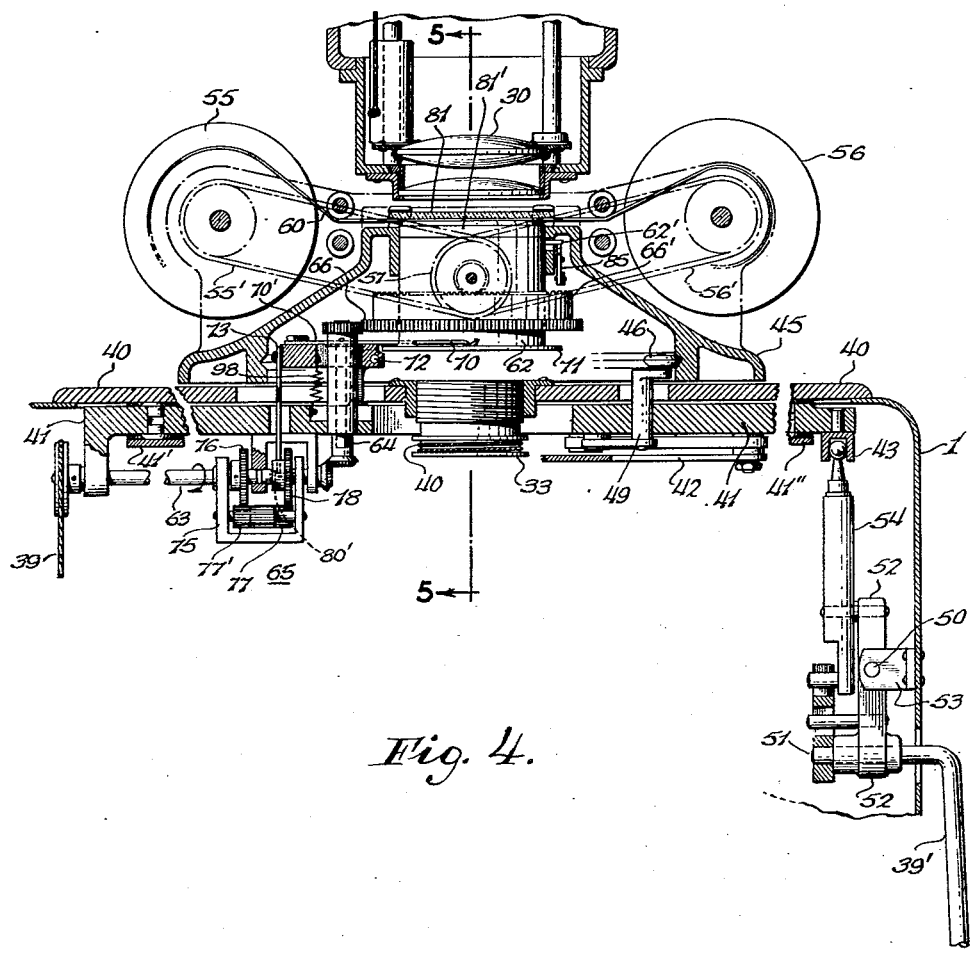
Figure 4 is a partially sectional view of the upper portion of the embodiment of the invention.

Referring to Figure 1, the microfilm reader of the present invention generally comprises a cabinet member 1, a little less than shoulder high, having a stationary viewing screen 2 mounted in its upper front surface. On top of the cabinet member 1 is mounted a projector 3 which contains a projector lamp, and suitable film holding and moving apparatus. The projector projects an image down along the line 4 onto the bottom mirror 5. The image is then projected upwardly along the line 6 onto the upper mirror 7 and thence, along the line 8 onto the stationary viewing screen 2. The lower mirror 5 may move from the position shown in full lines for maximum magnification, to the position shown in dotted lines 5', for minimum magnification. The minimum magnification position of the upper mirror 7 is shown by the dotted lines 7'.

When the magnification is changed as desired by the viewer, both mirrors must be tilted to maintain the proper angular relationship for projecting the image onto the screen 2. This angular relationship is provided by a pair of cams 10 and 11. The long thin cam 10 establishes the angular relation of the lower mirror 5 which is connected to the cam through cam follower 10'. The cam follower 10' is spring loaded by means of the spring 12, Figure 2.

The mirror 5 slides along guide rods 13 and 13' and it is lifted up and down by means of the chain 14 which is connected to the upper drive sprocket 15 and the lower sprocket 16. The upper sprocket 15 is connected to a knob 15' which is operated by the viewer to change the magnification. The sprocket 15 is also connected by the chain 17 to the sprocket 18 which is connected to the upper cam 11.

The upper mirror 7 is pivotally connected to the case at point 20 and is spring loaded to the cam 11 by the spring 21 so that the cam follower 22, connected to the mirror mounting 23, bears against the cam 11.

The position of the mirror 5 shown is that of maximum magnification. As the knob 15 is turned to decrease magnification, it will raise the mirror 5 and both mirrors will be tilted predetermined amounts according to the cams 10 and 11. The adjustable arms 24 and 25 provide tension adjustments for the chains 14 and 17.

The projector 3 contains a novel condensing lens system having a movable lens element 30 which slides up and down and varies the width of the light beam so as to provide a brightness control as will be more fully described. The brightness control lens 30 is connected by means of the cable 31 to a pulley on shaft 32 and moves with the cam 11. Therefore, as the magnification is changed, the sliding lens 30 is also operated to change the brightness proportionally. The brightness control is necessary since the present system has a magnification ratio of 3:1 which would normally have a brightness ratio of 9:1. This ratio in brightness is not tolerable in a microfilm reader and, therefore, other means must be taken to minimize the change in brightness. Most prior art readers utilize a mechanical diaphragm to cut off some of the light at minimum magnification. In the present there is a light source providing a narrow beam for large magnification and a wider beam for low magnification so that the mirror surfaces are evenly illuminated at all positions, no light is wasted, and the brightness is stabilized. The movable condensing lens system is also designed and arranged to focus on the objective lens 33 at both extremities these being conjugate distances in the lens system. The lens system is fully described in copending application S. N. 388, 618, filed October 27, 1953, in the name of Phillip J. Brownscombe.

Figure 2 shows a sectional view taken along the lines 2—2 of Figure 1, showing a plan view of the mirror 5 and how it is connected for movement. The mirror 5 is pivotally mounted on a shaft 35' by bracket 35 and is adapted to slide up and down on the guide rods 13 and 13'.

The mirror 5 is moved up and down by means of the chain 14 as shown in Figure 3. The chain 14 is broken at, and fixedly connected to, the bracket 35 and rides around the lower sprocket 16 which is rotatably connected to the case 1 by means of the shaft 36. The shaft 36 extends across the case 1 and has another sprocket 16' on the other side upon which is a chain 14' not shown.

Therefore, as the enlargement or magnification knob 15' is turned the mirror 5 will be moved up or down along the guide rods 13 and 13', which are fixedly connected to case 1 by bracket 10'.

The mirror 5 is fixedly mounted on the bracket 38 which is fixedly connected to shaft 35' which is rotatably supported in bracket 35. The tilting of the mirror 5 is accomplished by means of the long vertical cam 10 and cam follower 10' which is fixedly connected to the mirror by means of the bracket 39 and through shaft 35'. The mirror is spring loaded by the spring 12 mounted around the shaft 35' in such a manner that the cam follower 10' bears on the cam 10.

Referring again to Figure 1, as the magnification is changed, the mirrors are displaced and, therefore, the objective lens 33 must be focused so that it will focus on the screen 2 at all positions of the mirrors.

This focusing is automatically accomplished by means of a cable 29 which is connected to and wound about the barrel of the objective lens 33. The cable is connected by means of the pulley 29' to a cam follower 42 which rides on a cam 42', mounted on a shaft 32. The cam follower 42 is spring loaded to the case 1 of the instrument by means of the spring 43. A fine finger adjustment of the focusing of lens 33 may be made by knob 19 connected to shaft 19' having a pulley about which cable 29 is wound.

Therefore, as the magnification is changed, by means of the knob 15', mirror 5 is moved up or down, both mirrors are tilted predetermined amounts to obtain the proper angle for projection, the objective lens 33 is automatically focused on the screen 2 and the brightness is automatically controlled by means of the adjustable lens 30 which is connected to the shaft 32 by cable 31.

The film is advanced by either high speed knob 37 or low speed knob 38 which advances the film through cable 39, as will be more fully explained.

Figure 4 shows a partial sectional view of the upper portion of the microfilm reader showing the film advance mechanism, the image positioning mechanism and means for releasing the film pressure plates automatically before moving the film.

The plate member 40 is fixedly connected to the top of case 1. The plate member 41 is movable with respect to the case 1 and the plate 40 in response to the positioning handle 39 located on the right hand side of the case 1. The handle 39 is connected to the plate 41 through a linkage having double pivot connections at points 50 and 51. The handle 39 is connected to a member 52 which is pivoted on member 53 at point 50. The member 52 is loosely pinned to the member 54 which terminates in the ball and socket connections 43 which is connected to the plate 41. Therefore, the handle 39 can move the plate 41 forward and back or left and right for the purpose of centering the image on the viewing screen. Plate 41 is slidably supported by U brackets 41' and 41" connected to plate 40.

The projector turret base 45 is rotatably connected to the movable plate 41 by posts 49 and bearing rollers 46 and 46'. There are other bearing rollers which are not shown in this view. The bearing wheel 46 and post 49 are fixedly connected to the movable plate 41. A conventional parallelogram linkage 42 not completely shown, connects movable plate 41 to plate 40 and limits the movement of the projector to forward and back motions or left and right motions.

The film moving apparatus generally comprises a pair of spools 55, 56, which are connected to a centrally located driving clutch 57 by means of the cables 55' and 56'. The film 60 passes between upper pressure plate 81 and the lower pressure plate 81'. The lower pressure plate is a glass plate on cylindrical barrel 62, which is capable of being moved up and down with respect to the mounting base 45.

The film is advanced by operation of the cable 39 which drives the shaft 63 which is connected to vertical shaft 64 through a differential gearing arrangement 65. The vertical shaft 64 drives the cylindrical gear 66 which is rotatably mounted on the cylindrical member 62.

Figure 5:
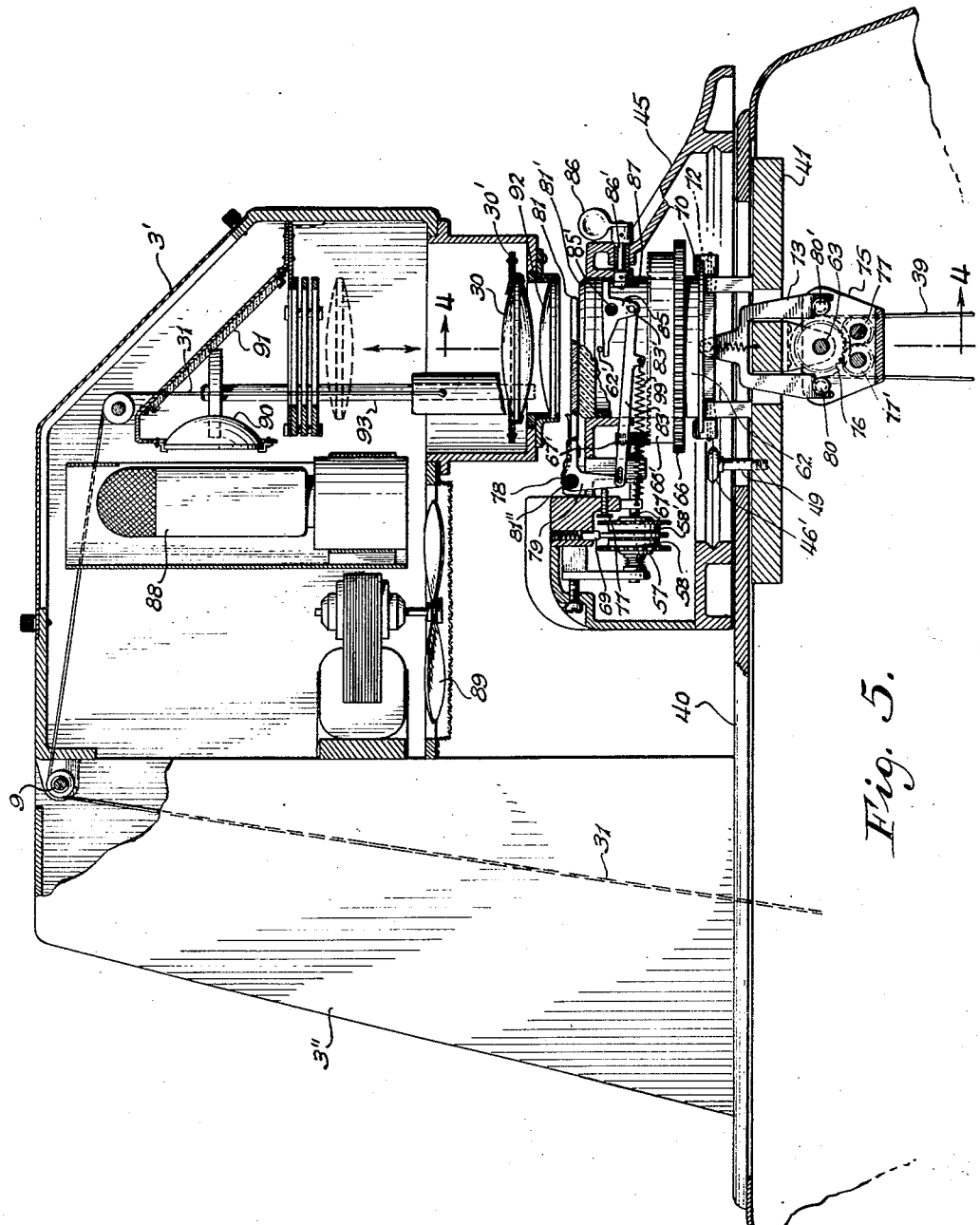
Figure 5 is a sectional view taken along the lines 5—5 of Figure 4.

Referring now to Figure 5 which is a sectional view of Figure 4, the cylindrical gear 66 has teeth 66' on its upper surface which connect to shaft 67 by means of the gear 67. The shaft 67 drives the film drive clutch 57. The clutch 57 is a conventional double clutch of the type which drives one output spool 58 when the shaft 67 is turned in one direction and which drives the other spool 58' when the shaft 67 is turned in the other direction. Spring loaded plunger 69 puts sufficient drag on the center disc of clutch 57 for proper operation.

Therefore, the film is moved by the following connection of elements: cable 39, shaft 63, differential 65, shaft 64 gears 66 and 66', gear 67', shaft 67, double clutch 57 and cables 55' and 56' connected to the driving clutch 57.

When it is desired to move the film, the lower and upper pressure plates must first be released. The lower pressure plate which is on the cylindrical member 62, is moved downward by means of the fork member 70 which rests on the lower lip 71 of the movable cylindrical member 62. The fork 70 is pivoted at the point 72, Figure 4, and is tilted about that point by the member 73, connected to the closed end of the fork.

The member 73 moves up when shaft 63 is turned in either direction as follows: Shaft 63 is connected through the yoke 75, Figure 4, to gear 76 and gears 77, 77', which drive gear 78. The gears 77, 77' are rotatably connected to the yoke 75. The yoke 75 has two pins 80 and 80', Figure 5, which contact the double prong member 73.

When shaft 63 turns in either direction, the yoke 75 will rotate one way or the other due to its pendulous mounting and due to friction of the film drive loading it. Referring to Figure 5, this tilting of the yoke member 75 in either direction will raise the member 73 which as previously mentioned tilts the fork member 70 and lowers the lower pressure plate 81' on movable cylindrical member 62.

The upper pressure plate 81, Figure 5, is pivotally connected at point 81" by bell crank 79, the lower end of which is pinned to a slot in member 83. The purpose of slot is to provide some lost motion so that the linkage will not become bound. The long member 83 is pivotally connected at its other end 83' to T member 85. There is another member 83" (not shown) on the other side of the barrel 62. The T member 85 is pivotally connected to the instrument at point 85'. Therefore, as the barrel 62 is moved down by the fork 70, the pin 62' on barrel 62 tips the T member about its pivot point and pulls member 83 forward, to the right, which thereby pivots the upper pressure plate 81 and raises it, releasing the film. The torsion spring 78 holds the bell crank 79 against adjustable screw stop 77 and sets up the plane of the upper pressure plate 81. The springs 99 and 99' on the other side (not shown) apply a force on member 83 which tends to tilt the T member 85 upwardly against the pins 62' which thereby self-centers the barrel 62 and lowers pressure plate 81'.

Therefore, both pressure plates 81 and 81' are released simultaneously. There is sufficient friction drag in the film driving mechanism so that the pressure plates are activated before the film starts to move. This is very important since if the film started to move first, it would be scratched or torn. The spring 98 always returns the yoke 75 to a normal position.

The handle 86 is for manual release of the pressure plate when inserting the film. Manual handle 86 is connected to the shaft 86' which is connected to an eccentrically mounted cam 87. When the handle 86 is rotated about the axis of shaft 86', the cam member 87 will tilt T member 85 about its pivot point 85' drawing member 83 forward, thereby raising the pressure plate 81. The rotation of T member 85 removes the support from pins 62' on barrel 60 and barrel will drop thereby releasing the lower pressure plate.

Figure 5 also shows the projector lamp 88, cooling fan 89, a collector lens 90, mirror 91, the movable condenser lens 30 and a fixed lens 92. The movable condenser lens is mounted in a holding member 30' which is adapted to slide up and down, guide posts of which one 93 is shown. The movable lens 30 is adapted to be moved up and down by means of the cable 31 which is connected to a pulley on the shaft 32, Figure 1, so that the lens 30 moves approximately proportionally to the magnification.

The purpose of the lens 30 is to vary the light beam width to provide a narrow beam where the lower mirror 5 is further away and to provide a wider beam so that the lower mirror will be fully illuminated at its closest position. The lens system is designed and constructed so that all the available light is used for all positions of magnification.

The lens system is designed to substantially focus on the objective lens 33 at all positions and the two extremities of the travel of the lens 30 are chosen to be conjugate distances so that the image will be focused on the objective lens at those points and will be substantially focused at points in between. The movable lens system for brightness control is claimed and described more fully in copending application S. N. 388,168, filed October 27, 1953, in the name of Phillip J. Brownscombe.

Front projector case 3' is pivotally mounted on rear projector case 3" at point 9. The rear projector case 3" is fixedly connected to plate 40.

Therefore, the present invention provides a microfilm reader which has the maximum magnification obtainable with a conventionally sized unit which has automatic brightness control means for utilizing this greater range of magnification. The present invention also incorporates means for automatically focusing the objective lens for all positions of magnification.

The present invention provides magnifications of up to 30 and furthermore, provides them on a stationary viewing screen. There are only two controls for the operator, namely, the magnification control and the film advance control. All focusing and brightness control is automatically incorporated.

We claim:

1. A microfilm reader comprising a cabinet having a stationary viewing screen mounted in its front surface, a projector mounted on top of said cabinet having an adjustable light intensity means, a first mirror, means to adjust the height of said first mirror above the bottom of said cabinet, means to adjust the angle of said first mirror as it is raised including a vertical cam, a second mirror adjustably mounted near the top of said cabinet, and cam means to adjust the angle of said second mirror as said first mirror is raised, said cam being connected to said adjusting means of said first mirror whereby the image from said projector head is reflected onto said viewing screen.

2. A microfilm reader comprising a cabinet, a stationary viewing screen mounted in the front of said cabinet, a projector mounted on top of said cabinet and adapted to project an image, a first mirror adjustably mounted in height and angle and adapted to be lowered close to the bottom of said cabinet, a second mirror adjustably mounted behind said viewing screen, whereby an image is projected from said projector to said first and second mirrors and stationary viewing screen and control means connected to said mirrors to adjust their rotation proportionally to said height movement of said first mirror.

3. A microfilm reader comprising a cabinet, a stationary viewing screen mounted in the front of said cabinet, a projector mounted on top of said cabinet and adapted to project an image, a first mirror adjustably mounted in height and angle and adapted to be lowered close to the bottom of said cabinet, a second mirror adjustably mounted behind said viewing screen, control means connected to said mirrors to adjust their rotation proportionally to said height movement of said first mirror and means to vary the magnification of said image including means to raise and lower said first mirror.

4. A microfilm reader comprising a cabinet, a stationary viewing screen mounted in the front of said cabinet, a projector mounted on top of said cabinet and adapted to project an image, a first mirror adjustably mounted in height and angle and adapted to be lowered close to the bottom of said cabinet, a second mirror adjustably mounted behind said viewing screen and means to vary the magnification of said image including means to raise and lower said first mirror and cam means connected to said raising means to vary the angles of said first and second mirrors to keep the image on said stationary screen as said first mirror is raised and lowered.

5. A microfilm reader comprising a cabinet, a stationary viewing screen mounted in the front of said cabinet, a projector mounted on top of said cabinet and adapted to project an image, a first mirror adjustably mounted in height and angle and adapted to be lowered close to the bottom of said cabinet, a second mirror adjustably mounted behind said viewing screen and means to vary the magnification of said image including means to raise and lower said first mirror and means to vary the angles of said first and second mirrors to keep the image on said stationary screen as said first mirror is raised and lowered and comprising a vertical cam and cam follower connected to said first mirror to adjust the angle of said mirror in predetermined manner as said mirror is raised.

6. A microfilm reader comprising a cabinet, a stationary viewing screen mounted in the front of said cabinet, a projector mounted on top of said cabinet and adapted to connect an image, a first mirror adjustably mounted in height and angle and adapted to be lowered close to the bottom of said cabinet, a second mirror adjustably mounted behind said viewing screen and means to vary the magnification of said image including means to raise and lower said first mirror and means to vary the angles of said first and second mirrors to keep the image on said stationary screen as said first mirror is raised and lowered comprising a vertical cam and cam follower connected to said first mirror to adjust the angle of said mirror in predetermined manner as said mirror is raised and a second cam and follower connected to said second mirror to vary the angle of said second mirror as said first mirror is adjusted.

7. A microfilm reader comprising a cabinet, a stationary viewing screen mounted in the front of said cabinet, a projector mounted on top of said cabinet and adapted to project an image, a first mirror adjustably mounted in height and angle and adapted to be lowered close to the bottom of said cabinet, a second mirror adjustably mounted behind said viewing screen, and means to adjust the magnification of said image comprising means connected to raise said first mirror and cam means connected to vary the angles of said mirrors as said first mirror is raised to keep the image on said stationary screen and means to stabilize the light intensity of said projector as said magnification is changed comprising a variable condenser lens assembly connected to said first mirror to vary the light intensity of said projector as said first mirror is moved to change the magnification.

8. A microfilm reader comprising a cabinet, a stationary viewing screen mounted in the front of said cabinet, a projector mounted on top of said cabinet and adapted to project an image, a first mirror adjustably mounted in height and angle and adapted to be lowered close to the bottom of said cabinet, a second mirror adjustably mounted behind said viewing screen, and means to adjust the magnification of said image comprising means connected to raise said first mirror and cam means connected to vary the angle of said mirrors as said first mirror is raised to keep the image on said stationary screen, and means to stabilize the light intensity of said projector as said magnification is changed comprising a variable condenser lens assembly connected to said first mirror to vary the light intensity of said projector as said first mirror is moved to change the magnification, objective lens means at the focal point of said first lens means, and means to adjust said objective lens means as said first and second mirrors are moved comprising a connection between said objective lens and one of said mirrors.

9. A microfilm reader comprising a stationary screen, a projector, a pair of mirrors, means connected to move said mirrors to vary the magnification, a pair of cams, at least one of said cams being connected to said moving means a pair of cam followers connected to said mirrors and to said cams to maintain an image from said projector on said stationary screen at all times and means to control the brightness on said screen for different magnifications comprising a movable condenser lens system in front of said projector adapted to vary said projector light beam width with varying magnification, said movable lens being connected to said mirror moving means.

10. A microfilm reader comprising a stationary screen, a projector, a pair of mirrors, means connected to move said mirrors to vary the magnification, a pair of cams, at least one of said cams being connected to said moving means a pair of cam followers connected to said mirrors and said cams to cause an image from said projector to remain on said stationary screen at all times, means to control the brightness on said screen for different magnifications comprising a movable condenser lens system in front of said projector adapted to vary said projector light beam width with varying magnification, said movable lens being connected to said mirror moving means an objective lens in front of said movable condenser lens, and means connecting said objective lens to said mirrors for focusing said image on said screen for all positions of said mirrors.

11. A microfilm reader comprising a cabinet; a stationary viewing screen mounted in the front of said cabinet; a projector mounted on top of said cabinet and adapted to project an image; a first mirror adjustably mounted in height below said projector and adapted to be lowered toward the bottom of said cabinet to change the magnification of said image; a second mirror adjustably mounted behind said viewing screen independently of, spaced from, and movable relative first mirror; and compensating control means connected to said mirrors to move said second mirror relative said first mirror proportionally to said height movement of said first mirror, whereby an image projected from said projector to said first and second mirrors is maintained on said stationary viewing screen as the magnification is changed.

12. A microfilm reader comprising a cabinet; a stationary viewing screen mounted in the front of said cabinet, a projector mounted on top of said cabinet and adapted to project an image, a first mirror adjustably mounted in height below said projector and adapted to be lowered close to the bottom of said cabinet, a second mirror adjustably mounted behind said viewing screen independently of said first mirror, compensating control means connected to said second mirror to change its position relative said first mirror as a fractional function of said height movement of said first mirror, and means to raise and lower said first mirror.

13. A microfilm reader comprising a cabinet, a stationary viewing screen mounted in the front of said cabinet, a projector including a focussing lens mounted on top of said cabinet and adapted to project an image, a first mirror adjustably mounted in height and adapted to be lowered toward the bottom of said cabinet, a second mirror adjustably mounted behind said viewing screen independently of said first mirror and spaced from said first mirror, control means connected to said mirrors to change their relative positions proportionally to said height movement of said first mirror, and means connecting said lens to said control means for focussing said image on said screen for all positions of said mirrors, whereby an image is projected from said projector to said first and second mirrors and stationary viewing screen.

References Cited in the file of this patent

UNITED STATES PATENTS

| | | |
|---|---|---|
| 2,181,696 | Herrschaft | Nov. 28, 1939 |
| 2,204,709 | Straubel | June 18, 1940 |
| 2,404,189 | Place | July 16, 1946 |
| 2,437,898 | Swanson | Mar. 16, 1948 |
| 2,692,529 | Halahan | Oct. 26, 1954 |

FOREIGN PATENTS

| | | |
|---|---|---|
| 257,153 | Switzerland | Sept. 30, 1948 |